(12) United States Patent
Meandzija (10) Patent No.: US 6,170,005 B1
(45) Date of Patent: Jan. 2, 2001

(54) SYNCHRONIZATION AND INFORMATION EXCHANGE BETWEEN COMMUNICATION COMPONENTS USING A NETWORK MANAGEMENT OPERATIONS AND CONTROL PARADIGM

(75) Inventor: Branislav N. Meandzija, La Jolla, CA (US)

(73) Assignees: Motorola, Inc., Schaumburg, IL (US); General Instrument Corporation, Horsham, PA (US)

(*) Notice: Under 35 U.S.C. 154(b), the term of this patent shall be extended for 0 days.

(21) Appl. No.: 09/096,861

(22) Filed: Jun. 12, 1998

Related U.S. Application Data

(60) Provisional application No. 60/064,178, filed on Nov. 4, 1997.

(51) Int. Cl.[7] .................................................. G06F 15/16
(52) U.S. Cl. .................................... 709/217; 709/248
(58) Field of Search .................................. 709/217–219, 709/229, 232, 248, 250, 201–205, 225, 400; 380/21; 370/236, 350, 503, 507, 509, 513

(56) References Cited

U.S. PATENT DOCUMENTS

| 5,317,568 | 5/1994 | Bixby et al. . |
| 5,519,863 | 5/1996 | Allen et al. . |
| 5,627,892 | 5/1997 | Kauffman . |
| 5,794,018 | * 8/1998 | Vrvilo et al. .......................... 709/248 |
| 5,968,135 | * 10/1999 | Teramato et al. ..................... 709/400 |
| 6,014,706 | * 1/2000 | Cannon et al. ....................... 709/231 |
| 6,041,342 | * 3/2000 | Yamaguchi .......................... 709/248 |

FOREIGN PATENT DOCUMENTS

WO 95/33309   12/1995   (WO) .

OTHER PUBLICATIONS

Agoulmine, Nazim et al., "Intelligent Model Updating System in Heterogeneous Networks," Conference on Communication Technology, 16 Sep. 1992, XP 000671596, pp. 19.07.1–19.07.4.

* cited by examiner

Primary Examiner—Victor R. Kostak
(74) Attorney, Agent, or Firm—Barry R. Lipsitz; Ralph F. Hoppin (57) ABSTRACT

A system for providing synchronization and information exchange in a network such as a digital television broadcast network using a network management operations and control paradigm. A management entity component, such as a computer workstation operated at a control center, coordinates the actions of different agent components, such as hardware used at the headend or uplink site of a television network. The agent components are used to provide conditional access to a television signal by inserting conditional access data into the transmitted programming. Management information bases (MIBs) are provided for the agent components and the management component. The agent components update their MIBs with information of the communication network, such as changes in a television event schedule. The management component periodically reads the agents' MIBs to obtain the updated information and store it in its own MIB. The management component provides information to the agents' MIBs according to the updated information obtained from the agents to synchronize the insertion of data into the digital broadcast data stream by the agents.

20 Claims, 3 Drawing Sheets

SYNCHRONIZATION AND INFORMATION EXCHANGE BETWEEN COMMUNICATION COMPONENTS USING A NETWORK MANAGEMENT OPERATIONS AND CONTROL PARADIGM

This application claims the benefit of U.S. Provisional Application No. 60/064,178, filed Nov. 4, 1997.

BACKGROUND OF THE INVENTION

The present invention relates to a method and apparatus for providing synchronization and information exchange in a network. The invention is particularly suitable for use with satellite uplink or headend components in a conditional access television communication network.

The following acronyms are used in this application:

| | |
|---|---|
| SNMP | Simple network management protocol |
| CA | Conditional Access |
| CCITT | International Telegraph And Telephone Consultative Committee (Translation) |
| CMIP | Common Management Information Protocol |
| CORBA | Common Object Request Broker Architecture |
| C(P)SI | Custom and/or Program Specific Information |
| CPSIM | Custom Program Specific Information Manager |
| CSI | Custom Service Information |
| CWG | Control Word Generator |
| DVB | Digital Video Broadcast |
| ECMG | Entitlement Control Message Generator |
| EFD | Event Forwarding Discriminator |
| EIS | Event Information Scheduler |
| EIT | Event Information Table |
| EMM | Entitlement Management Message |
| IIOP | Internet Inter ORB Protocol (a CORBA protocol) |
| IP | Internet Protocol |
| ITU | International Telecommunications Union |
| LAN | Local Area Network |
| MIB | Management Information Base |
| NIT | Network Information Table |
| OO | Object Oriented |
| ORB | Object Request Broker |
| OSI | Open Systems Interconnection |
| PAT | Program Association Table |
| PDG | Private Data Generator |
| PMT | Program Map Table |
| PSI | Program Specific Information |
| PSIG | PSI Generator |
| RMI | Remote Method Invocation |
| RST | Running Status Table |
| SDT | Service Description Table |
| SI | Service Information |
| SMI | Structure of Management Information |
| SNMP | Simple Network Management Protocol |
| TCP | Transaction Control Protocol |
| TDT | Time Date Table |
| TLI | Transport Layer Interface |
| TMN | Telecommunications Management Network |
| TP | Transport Protocol |
| UDP | User Datagram Protocol |
| WAN | Wide Area Network |

The synchronization and information exchange between headend and uplink components in broadband multimedia distribution networks is conventionally realized through a variety of custom communications protocols. Examples include protocols between generators of Entitlement Management Messages (EMMs) for Conditional Access (CA) Systems and other uplink/headend equipment which multiplexes those messages into the transport streams. Other examples include headends/uplinks with multiple Conditional Access Systems.

However, there is a need to enable information flow and synchronization between components within CA Systems and the headend/uplink. An example is the protocol between CA MPEG Program Specific Information (PSI) components (these are typically named Custom PSI-CPSI) and headend PSI components. For example, a headend of a cable television (CATV) network may receive video data from different programming services, e.g., ABC, CBS, CNN, HBO, NBC and the like, where the PSI components are specific to each programming service. Another example is the protocols between CA DVB Service Information (SI) components and headend SI components. These interfaces are typically referred to as Custom SI-CSI-SI interfaces.

Custom communications protocols using any of the standard data transport protocols such as OSI TP 0–4 or the standard Internet UDP or TCP protocols and Socket or TLI abstractions are rather complex. They take a long time to implement and integrate into systems (e.g., one to two years) and remain proprietary and therefore are difficult to maintain and upgrade.

The present invention avoids the need to define and implement new communications protocols through a combination of techniques from the so-called "network management" operations and control paradigm. In particular, already implemented management protocols are used, such as the Internet Simple Network Management protocol (SNMP), in combination with ITU-T X.700 event reporting and logging functions to solve problems with component synchronization and information exchange. More particularly, X.731 (state management), X.733 (alarm management), X.734 (event management), and X.735 (log management) are used within the non ITU-T framework to synchronize and exchange information between headend/uplink components or between headend/uplink and CA System components.

This approach advantageously combines the benefits of the sophisticated X.700 techniques with the simplicity of management frameworks such as SNMP while avoiding the high implementation cost of X.700 and the limited functionality of SNMP style frameworks.

SUMMARY OF THE INVENTION

The present invention relates to a method and apparatus for providing synchronization and information exchange in a network. The method allows a management entity component, such as a computer workstation operated at a control center, to coordinate the actions of different agent components, such as hardware used at the headend or uplink site of a television network. In particular, the agent components may be hardware (e.g., including firmware and software) used to provide conditional access to a television signal.

The invention is particularly suited for use in a broadband communication network, such as a CATV network or satellite broadcast network, that provides a digital broadcast data stream to a decoder population.

This hardware provides various forms of data that controls an end user's ability to access the television or other data. For example, with a tiered marketing scheme, only users who pay an additional fee can access specific premium programs. To implement such a scheme, it is necessary to provide conditional access data such as private data, entitlement management messages, program-specific information, and entitlement control messages with the transmitted programming.

While the use of such conditional access data is known, the present invention provides a system for managing and coordinating the insertion of the conditional access data into the transmitted programming stream using a network management operations and control paradigm.

A method for providing communication between first and second headend, uplink and/or conditional access agent components (e.g., agents) and a management component (e.g., manager) thereof in a communication network includes the step of providing respective management information bases (MIBs) for the first and second agent components and the management component. The MIB includes managed objects that represent managed resources. The first and second agent components update the respective MIBs with information of the communication network. For example, an agent may receive information regarding a new television program that requires conditional access data, in which case the agent makes a data entry in its MIB that corresponds to the new program.

The management component periodically reads the MIBs of the first and second agent components to obtain the updated information therefrom, and store the updated information in its respective MIB. Furthermore, the management component provides information to the MIBs of the first and second agent components to synchronize an insertion of data into a digital broadcast data stream by the first and second agent components. For example, a component may create and insert Conditional Access Systems specific information into an MPEG transport stream. Essentially, the management component and the first and second agent components are synchronized with one another.

The first agent component may advertise event schedule information of the communication network by making the event schedule information available to the management component and the second agent component via the first agent component's respective MIB.

The method may include the further step of transmitting event reporting information from the management component to at least the first agent component to allow the first agent component to implement an event reporting procedure. The event reporting information defines pre-conditions for the first agent component to declare an event. The pre-conditions may relate to a value or state change of a parameter that is monitored by the agent. For example, a pre-condition for generating an event may be that a MIB variable has crossed a specified threshold, or a state of the agent has been changed.

The agent has the ability to asynchronously notify the management component of an event when the pre-conditions have been met.

When a plurality of management components are provided in the communication network, the method may include the further step of transmitting information from at least a particular one of the management components to the first and second agent components to register the particular management component as a recipient of the asynchronous event notifications thereof. That is, the managers instruct the agents to send event notifications to them.

The method may include the further step of transmitting event logging information from the management component to at least the first agent component to allow the first agent component to implement an event logging procedure according to the event reporting procedure. The event logging information defines pre-conditions for the first agent component to log an event. For example, some events may be generated but not logged, e.g., recorded, if they are not sufficiently important. Or, a particular event may not be logged unless it occurs a number of times.

The method may include the further step of transmitting event forwarding discriminator information from the management component to at least the first agent component to allow the first agent component to implement an event forwarding discriminator procedure according to the event reporting procedure. The event forwarding discriminator information defines pre-conditions for the first agent to forward an event to the component to the management component. The manager is not necessarily notified of all events that are generated at the agent. The EFD pre-conditions thus define which events should be communicated to the manager by filtering all generated events.

At least one of the first and second agent components may be a conditional access agent component for inserting conditional access data, such as EMMs and ECMs, into the digital broadcast stream. Furthermore, the management component may provide the conditional access information to the MIB of the conditional access agent component.

A corresponding apparatus is also presented.

An apparatus is also present for providing communication between first and second headend, uplink and/or conditional access agent components and a management component thereof in a communication network. The apparatus includes at least one memory associated with the first and second agent components providing respective management information bases (MIBs) thereof. That is, the agents may have their own memories, or share a common memory. A memory associated with the management component provides a MIB thereof.

Transceivers and processors are also associated with the first and second agent components, and with the management component. The agents' processor(s) are responsive to their transceiver(s) for updating their MIBs with information of the communication network. The manager's transceiver is responsive its processor for periodically (e.g., intermittently) transmitting control signals to the agent's processor(s). The agents' transceiver is responsive to their processor(s) and the control signals from the manager for transmitting the updated information from their MIBs to the manager's transceiver for storage at the manager's MIB.

The manager's transceiver is responsive to its processor for periodically transmitting information to the agents' processor(s) for storage at the agents' MIBs to synchronize insertion of data into the digital broadcast data stream by the first and second agent components.

Generally, the manager has its own memory and processor, but it is possible for the manager and agents to share common hardware, e.g., when they are co-located.

DETAILED DESCRIPTION OF THE INVENTION

The present invention relates to a method and apparatus for providing synchronization and information exchange in a network using a network management operations and control paradigm.

Figure 1:
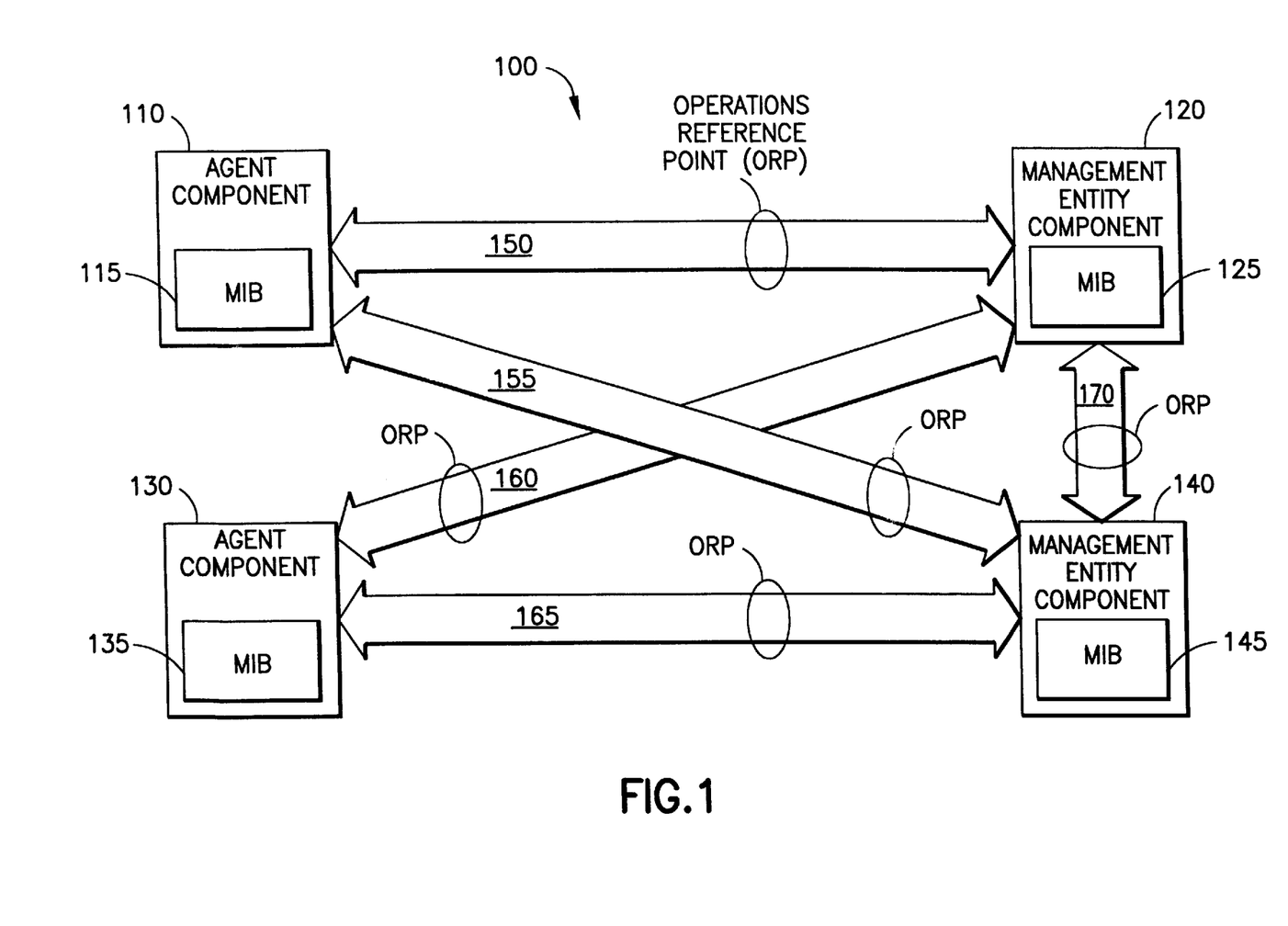
FIG. 1 illustrates a network with management entity components and agent components in accordance with the present invention.

FIG. 1 illustrates a network with management entity components and agent components in accordance with the present invention. The network, shown generally at 100, includes one or more management entity components (e.g., managers), such as management entity components 120 and 140, and one or more agent components (e.g., agents), such as agent components 110 and 130. The management entity components 120 and 140 may be headend, satellite uplink, or conditional access system management entities that act in a manager's role. The management entity components 120 and 140 may also act in an agent's role with respect to another manager.

The agent components 110 and 130 may be headend, satellite uplink, or conditional access system agent entities that act in an agent's role.

Each component includes a management information base (MIB). Specifically, MIBs 115, 125, 135 and 145 are associated with components 110, 120, 130 and 140, respectively. A MIB identifies the network elements (e.g., managed objects) that are to be managed, and contains a name that is associated with each managed object. Network management protocols use the MIB to define the managed objects in the network. The MIB defines the contents of the information carried with the network management protocols, as well as information describing each network management user's ability to access elements of the MIB, e.g., read or write access.

Note that while FIG. 1 illustrates two agent components and two management entity components, it is possible to have one or more of either type of component. Moreover, each component may be implemented in common or different hardware, and be co-located or remote from one another.

Bi-directional communication paths 150, 155, 160, 165 and 170 allow the different components to communicate with one another. First, the management entity components configure CA/headend/uplink events and EFDs at the component agents. Second, the management entity components get CA/headend/uplink MIB information from the agent components. The management entities update their local MIBs with this information. Third, the agent components send asynchronous notifications to the management entity components. An asynchronous notification means that the time of sending the notification by the agent is random from the manager's perspective, and is not in response to an immediately preceding request. Fourth, the management entity components provide CA/headend/uplink MIB updates to the agent components.

In particular, the interaction between the CA/headend/uplink system components is accomplished though the network management system as follows. The component advertises information such as DVB/MPEG SI/PSI information including event schedules through the MIB. For example, the MIB can comprise SNMPv2 SMI MIB. This is accomplished through a software agent (e.g., SNMPv2 agent) or through an object server (e.g., CORBA object server or Java™ RMI object server).

For example, a component may advertise event schedules for television programming. The status of the program/event information may change due to a change in scheduled programs. An EIS, discussed in connection with FIG. 2, may be used to change this status. A certain amount of time before the start of the new program, the EIS changes a data entry in an agent's MIB that corresponds to the new program. This MIB information is made accessible to all managers. Additionally, the change in the data entry causes a MIB value-change event to be generated, which is then processed by an EFD to determine if a management entity should be notified. If so, notifications are generated and distributed to every management entity that is registered to receive the information. Advertising thus refers to making the new MIB data available to managers and distributing notifications if warranted.

However, advertising of event scheduling is only one of the things that can be accomplished by the ORPs. An ORP may also be used to distribute EMMs to multiplexers, distribute ECMs to ECM generators, and synchronize ECMGs with synchronizers.

The agent components implement X.733, X.734, and X.735 event reporting and logging by using the asynchronous notification capability of the management system. These capabilities include SNMP event notifications and special SNMP MIBs implementing event definitions, event forwarding definitions, and event logging.

The CA System Manager (e.g., management entities 120 and/or 140) reads the headend/uplink MIBs on a fixed or varying periodic basis, updates its custom information and registers itself as a recipient of events caused by updates in the uplink MIB. The manager needs to periodically read the agent MIBs since the information at the agent can change as a result of a change in a component that is represented by an agent, and as a result of a change initiated by the manager.

The CA System Manager updates the headend/uplink with CA information on a periodic basis or upon receiving an event from the headend/uplink or another CA System component by setting the uplink MIBs through the network management protocol, or by updating its own MIBs which cause events that result in notifications to be sent to the headend/uplink manager.

FIG. 1 illustrates this synchronization and information exchange mechanism within the uplink/headend.

In accordance with the present invention, an Operation Reference Point (ORP) defines the interface between two headend/uplink components. It replaces a custom communications protocol which would need to be designed for the particular interface by a generic information exchange and event notification mechanism.

The four basic ingredients which enable ORP-based information exchange and synchronization are:

1. Information access through a standardized management protocol such as SNMP or CMIP, an enhanced SNMP protocol such as described in commonly assigned, co-pending U.S. patent application Ser. No. 09/075,605 to B. Meandzija, filed May 11, 1998, and incorporated herein by reference, or through a standardized OO protocol such as CORBA IIOP or Java™ RMI;

2. Information advertisement through a management information base or an object broker;

3. Event trigger configuration, event forwarding configuration, and event notifications; and 4. Event logging.

In the following sections, an implementation of ORPs for C(P)SI/(P)SI interaction is conceptualized using the following technologies:

1. SNMPv2 as the management protocol;

2. SNMPV2 SMI MIBs for information advertisement;

3. SNMPv2 event and EFD MIBs and event notifications implementing a variant of the ITU-T X.731, X.733, and X.734 based state and event management; and 4. SNMPv2 logging and logging control MIBs implementing a variant of the ITU-T X.731 and X.735 based log management.

Event Mechanism

The event mechanism enables managers to configure the types of events that can be generated by an agent, and when those events should be transformed into asynchronous notifications (e.g., SNMP Traps) to be sent to different managers. The mechanism and information model used are based on the ITU-T TMN X.733 and X.734 standards defining event management and alarm reporting. The following object groups are defined:

Events Group—This group comprises event configuration information defining the types of events that the agent shall generate.

Event Forwarding Discriminator (EFD) Group—This group comprises EFD configuration information defining what types of events an EFD will transform into notifications, at what times of day it will do so, and to which managers it will send the notifications.

Event Notifications—This group defines three types of notifications which an agent can send to a manager, namely an alarm, a state change notification, and a value change notification. Each EFD specifies what type of notification is to be sent for an event that has occurred in the agent. The EFD also specifies the conditions under which such a notification is to be sent, and the IP address of the manager to which the notification is to be sent. All standard SNMP traps are sent to the managers UDP port 162. All management platforms like HP OpenView™, Sun DomainManager™, and so forth support this mechanism.

The Events Group stores event descriptions in a table. Each row in the table corresponds to an event that the agent is to generate. The event description in that table specifies when the agent is to generate the event, e.g., because a MIB variable has crossed a specified threshold, because a state has been changed, etc.

Once the agent generates an event as specified in the Event table, it checks the EFD Table to find an EFD that matches that event and specifies what kind of notification is to be generated, and to which manager that notification is to be sent. The match is performed based on event characteristics such as event type, etc.

The EFDs in the EFD Table are controlled by three state/status variables, namely the administrative state, the operational state, and the availability status of the agent. If the administrative state is not unlocked, or the operational state is not enabled, or the availability status is not available, the EFD is inactive, which means it is ignored by the agent. The manager sets the administrative and operational states. The availability status is set as a result of an automatic scheduling function that is also associated with the EFD and specified in the EFD table. This scheduling function includes specifications of a daily start and stop time, and a weekly mask specifying when the EFD changes availability status from off-duty to available.

Event Group

This group, set forth in Table 1, comprises event configuration information defining the types of events that the agent shall generate.

TABLE 1

| Common Information Model - CIM Simulcrypt Events Module - EM Events Group - Event Configuration Table | Object Justification | Maximum Access Right |
|---|---|---|
| emEventName, the unique name of the target event, EntryName (SNMP) | provides a unique identification of an event | read |
| emEventAdminiState, administrative state of a table row, enumerated | enables concurrency control | read-write |

TABLE 1-continued

| Common Information Model - CIM Simulcrypt Events Module - EM Events Group - Event Configuration Table | Object Justification | Maximum Access Right |
|---|---|---|
| type (ITU-T X.731) | between multiple management entities | |
| emEventType, indicates the type of event, enumerated type (ITU-T X.734) | enables differentiation between distinct event types | read-write |
| emEventText, a description of an event's function and use, ASCII string of maximum 256 characters | enables textual description of an event for human readers | read-write |
| emEventChangedObjectId, the object identifier of the MIB object to check and see if the event should fire (groups of objects are identified by specifying an intermediate node), OBJECT IDENTIFIER (SNMP) | enables association of MIB objects with events | read-write |
| emEventToStateChange, if emEventChangedObjectId is a state/status variable this variable identifies the state that causes the event to be generated, 32 bit unsigned integer | enables association of events with state/status variables | read-write |
| emEventRisingThreshold, if emEventChangedObjectId is a threshold variable this variable indicates the threshold value to check against; if the value of emEventChangedObjectId is greater than or equal an event is generated; 32 bit unsigned integer | enables association of events with threshold variables | read-write |
| emEventFallingThreshold, if emEventChangedObjectId is a threshold variable this variable indicates the threshold value to check against; if the value of emEventChangedObjectId is less than or equal an event is generated; 32 bit unsigned integer | enables association of events with threshold variables | read-write |
| emEventProbableCause, defines further probable cause for the last event of this type, enumerated type (ITU-T X.734) | enables differentiation between event causes | read |
| emEventPerceivedSeverity, defines the perceived severity of the last event of this type, enumerated type (ITU-T X.734) | enables differentiation of event severity level | read |
| EmEventTrendIndication, indicates the trend of the last event of this type, enumerated type (ITU-T X.734) | enables the indication of the event trend, i.e. more/less severe | read |
| emEventBackedUpStatus, indicates the backed up status of the object causing the event, enumerated type (ITU-T X.731) | enables identification of backed up objects | read-write |
| emEventBackedUpObject, if the backed up status is backedUp this variable contains the object identifier of the back up object, OBJECT IDENTIFIER (SNMP) | enables specification of back up objects | read-write |
| emEventSpecificProblems, identifies the object responsible for the problem, OBJECT IDENTIFIER (SNMP) | enables specification of specific problems | read-write |
| emEventFrequency, identifies the number of seconds to wait between event frequency checks, 32 bit unsigned integer | enables event throttling | read-write |
| emEventPersistence, identifies whether the event is generated only once or whether it is repeated in emEventFrequency intervals, TruthValue (SNMP) | enables reliable event delivery | read-write |
| emEventStatus, status variable for synchronizing row creation/deletion between management entities, RowStatus (SNMP) | enables synchronization of row creation/deletion | read-write |

Event Forwarding Discriminator (EFD) Group

This group, set forth in Table 2, comprises EFD configuration information defining what types of events an EFD will transform into notifications, at what times of day it will do so, and to which managers it will send the notifications. An EFD generates a notification if it is unlocked (administrative state), enabled (operational state) and available (availability status), and if all of the specified discriminators are true, e.g., if emEfdDiscriminatedTypes is specified, then the type indicated has to match the type of the event for a notification to be generated. If multiple discriminators are specified by a single EFD, then all have to be matched (e.g., using a logical AND) before a notification is generated. A discriminator that is not specified in an EFD is always TRUE. A single event can match multiple EFDs and generate multiple notifications if so specified by the emEfdOr variable of Table 2.

TABLE 2

| Common Information Model - CIM Simulcrypt Events Module - EM Event Forwarding Discriminator (EFD) Group - EFD Table | Object Justification | Maximum Access Right |
|---|---|---|
| emEfdName, the unique name of the EFD, EntryName (SNMP) | provides a unique identification of an EFD | read |
| emEfdAdminState, administrative state of a table row, enumerated type (ITU-T X.731) | enables concurrency control between multiple management entities | read-write |
| emEfdOperState, operational state of an EFD, enumerated type (ITU-T X.731) | enables the indication of the current operation state | read-write |
| emdEfdAvailStatus, reflects the scheduling of the EFD, enumerated type (ITU-T X.731) | enables scheduling | read |
| emEfdStartTime, defines the date and time at which an unlocked and enabled EFD starts functioning, i.e. changes the availability status from offDuty to available, DateAndTime (SNMP) | enables the scheduling of EFDs | read-write |
| emEfdStopTime, defines the date and time at which an unlocked and enabled EFD stops functioning, i.e. changes its availability status from available to offDuty, DateAndTime (SNMP) | same | read-write |
| emEfdDailyStartTime, defines the daily start time at which an unlocked and enabled EFD starts functioning, i.e. changes its availability status from offDuty to available, TimeTicks (SNMP) | enables daily scheduling of EFDs | read-write |
| emEfdDailyStopTime, defines the daily stop time at which an unlocked and enabled EFD stops functioning, i.e. changes its availability status from available to offDuty, TimeTicks (SNMP) | same | read-write |
| emEfdWeeklyMask, defines the weekly schedule at which an unlocked and enabled EFD starts functioning, an octet string of 1 octet | enables weekly scheduling | read-write |
| emEfdTypes, the event type that this EFD may generate notifications for, enumerated type (ITU-T X.734) | enables an EFD to be specialized for a particular event type | read-write |
| emEfdCause, the probable cause that this EFD may generate notifications for, enumerated type (ITU-T X.734) | enables an EFD to be specialized by probable cause | read-write |
| emEfdPerceivedSeverity, the perceived severity that this EFD may generate notifications for, enumerated type (ITU-T X.734) | enables an EFD to be specialized by severity | read-write |
| emEfdSpecificProblems, the identifier of the object that may cause the generation of a notification by this EFD, OBJECT IDENTIFIER (SNMP) | enables an EFD to be specialized by event causing Object | read-write |
| emEfdTrendIndication, identifies the event trend that will cause a notification to be generated, enumerated type (ITU-T X.734) | enables an EFD to be specialized by event trend | read-write |

TABLE 2-continued

| Common Information Model - CIM Simulcrypt Events Module - EM Event Forwarding Discriminator (EFD) Group - EFD Table | Object Justification | Maximum Access Right |
|---|---|---|
| emEfdChangedObjectId, identifies the object whose value change shall cause the generation of a notification, OBJECT IDENTIFIER (SNMP) | enables an EFD to be specialized by value change of an object | read-write |
| emEfdToStateChange, the to state of the object that may cause the generation of a notification by this EFD, 32 bit unsigned integer | enables an EFD to be specialized by a state value | read-write |
| emEfdNotification, identifies the notification object identifier to be generated if conditions are met, OBJECT IDENTIFIER (SNMP) | enables the association of a notification type with an EFD | read-write |
| emEfdOr, identifies whether the EFD table shall be searched further for other possible matches and further possible notification generation, enumerated | enables multiple notifications to be generated by an event | read-write |
| emEfdTarget, the IP address of the management entity to receive the notification if generated, IpAddress (SNMP) | enables the specification of the target management entity for the notifications generated by the EFD | read-write |
| emEfdText, a description of an event's function and use, ASCII string of maximum 256 characters | enables textual description of an EFD for human readers | read-write |
| emEfdStatus, status variable for synchronizing row creation/deletion between management entities, RowStatus (SNMP) | enables synchronization of row creation/deletion | read-write |

Event Notification Group

This group defines three types of notifications which an agent can send to a manager. These are an alarm, a state change notification, and a value change notification. Each EFD specifies what type of notification is to be sent for an event that has occurred in the agent. The EFD also specifies the conditions under which such a notification is to be sent and the IP address of the manager to which the notification is to be sent. All standard SNMP traps are sent to the manager's UDP port 162. All management platforms like HP OpenView, Sun DomainManager, etc. support this mechanism.

The first notification type that can be generated is an emEventAlarm, which carries, in addition to the standard SNMPv2 notification parameters, the following objects from the events table:
    emEventName
    emEventType
    emEventProbableCause
    emEventSpecificProblems
    emEventPereceivedSeverity
    emEventTrendIndication
    emEventText The second notification type that can be generated is an emEventStateChange which carries, in addition to the standard SNMPv2 notification parameters, the following objects from the events table:
    emEventName
    emEVentStateChange
    emEventChangedObjectId The third notification type that can be generated is an emEventobjectValueChange which carries, in addition to the standard SNMPv2 notification parameters, the following objects from the events table:

emEventName emEventChangedObjectId

Logging Mechanism

The logging mechanism enables managers to configure the types of logs that can be generated by an agent. The mechanism and information model used are based on the ITU-T TMN X.735 Log Model.

The log, in addition to conceptually storing the logged information, determines which information is to be logged. Each log contains a discriminator construct which specifies the characteristics an event must have in order to be selected for logging. Thus, the generated events are filtered by the discriminator construct to determine which events are to be logged. The logging mechanism comprises the following object groups:

Log Control Group—This group defines the types of log tables the agent is maintaining, their discriminators, the log scheduling, etc; and The Logs Group—This group defines three logs: the alarm logs, the state change logs, and the object value change logs.

Logs are controlled by the Log Control Table as specified in the ITU-T TMN X.735. Each entry in that table associates events with logs, and specifies when the event is to be logged in that log. The event is logged if the log discriminator holds. That is, if the event is of a certain type, if it has been generated by a certain object, if it exceeds a certain threshold, etc. The log control entries themselves are controlled by state/status variables, the administrative state, the operational state, and the availability status of the agent. The manager can set the administrative and operational states. The availability status is set by the agent itself based on an automatic log control scheduling mechanism which specifies the times during which the logs are to be made.

Log Control Table entries also specify log control information and log statistics. The three logs defined are defined as tables in which each event is stored as a row. The logs in the alarm log table are logs of alarm events that have passed the log control discriminator in the Log Control Table. Similarly the logs in the state change log table are logs of state changes. And, logs in the object value change table are logs of object value changes.

Log Control Group

This group, set forth in Table 3, defines the types of log tables the agent is maintaining, their discriminators, the log scheduling, etc.

TABLE 3

| Common Information Model - CIM Simulcrypt Logs Module - LM Log Control Group - Log Control Table | Object Justification | Maximum Access Right |
|---|---|---|
| ImLogControlName, the unique name of the Log Control Entry, EntryName (SNMP) | provides a unique identification of a Log Control Entry | read |
| ImLogControlId, the unique log table identifier, OBJECT IDENTIFIER (SNMP) | provides a unique identification of Log Tables | read-write |
| ImLogControlAdminiState, administrative state of a table row, enumerated (ITU-T X.731) | enables concurrency control between multiple management entities | read-write |
| ImLogControlOperState, operational state of an EFD, enumerated (ITU-T X.731) | enables the indication of the current operation state | read-write |
| ImLogControlAvailStatus, reflects the scheduling of the Log Control entry, enumerated (ITU-T X.731) | enables scheduling | read |
| ImLogControlFullAction, defines what action to take when the maximum log table size has been reached, enumerated (ITU-T X.735) | enables control of log full action | read-write |
| ImLogControlMaxLogSize, defines the maximum size of a log table in number of octets, 32 bit unsigned integer | enables control of the maximum log table size | read-write |
| ImLogControlCurrentLogSize, defines the current log table size, 32 bit unsigned interger | enables monitoring of log table size | read |
| ImLogControlNumberOfRecords, specifies the number of log records in the log table, 32 bit unsigned integer | enables monitoring of the log table size | read |
| ImLogControlStartTime, defines the date and time at which an unlocked and enabled Log Control entry starts functioning, i.e. changes the availability status from offDuty to available, DateAndTime (SNMP) | enables the scheduling of Log Controls | read-write |
| ImLogControlStopTime, defines the date and time at which an unlocked and enabled Log Control entry stops functioning, i.e. changes its availability status from available to offDuty DateAndTime (SNMP) | same | read-write |
| ImLogControlDailyStartTime, defines the daily start time at which an unlocked and enabled Log Control entry starts functioning, i.e. changes its availability status from offDuty to available, TimeTicks (SNMP) | enables daily scheduling of log control entries | read-write |
| ImLogControlDailyStopTime, defines the daily stop time at which an unlocked and enabled Log Control entry stops functioning, i.e. changes its availability status from available to offDuty, TimeTicks (SNMP) | same | read-write |
| ImLogControlWeeklyMask, defines the weekly schedule at which an unlocked and enabled Log Control entry starts functioning, octal string of length 1 | enables weekly scheduling | read-write |
| ImLogControlTypes, the event type that this Log Control entry may generate logs for, enumerated (ITU-T X.734) | enables a Log Control entry to be specialized for a particular event type | read-write |
| ImLogControlCause, the probable cause that this Log Control entry may generate logs for, enumerated (ITU-T X.734) | enables an Log Control entry to be specialized by probable cause | read-write |
| ImLogControlSeverity, the perceived severity that this Log Control entry may generate logs for, enumerated (ITU-T X.734) | enables an Log Control entry to be specialized by severity | read-write |
| ImLogControlSpecificProblems, the identifier of the object that may cause the generation of a log entry by this Log Control entry, OBJECT IDENTIFIER (SNMP) | enables an Log Control entry to be specialized by Object | read-write |
| ImLogControlToStateChange, the to state of the object that may cause the generation of a log entry by this Log Control entry, 32 bit unsigned integer | enables an Log Control entry to be specialized by a state value | read-write |
| ImLogControlTrendIndication, identifies the trend that will cause a log entry to be made, enumerated (ITU-T X.734) | enables specialization of log control based on event trends | read-write |
| ImLogControlChangedObjectId, identifies the object that changed value and should be logged, OBJECT IDENTIFIER | enables specialization of log control based on | read-write |

TABLE 3-continued

| Common Information Model - CIM Simulcrypt Logs Module - LM Log Control Group - Log Control Table | Object Justification | Maximum Access Right |
|---|---|---|
| (SNMP) ImLogControlStatus, status variable for synchronizing row creation/deletion between management entities, RowStatus (SNMP) | objects causing the event enables synchronization of row creation/deletion | read-write |

Logs Group

The three logs defined are defined as tables in which each event is stored as a row. The logs in the alarm log table, Table 4, are logs of alarm events that have passed the log control discriminator in the Log Control Table. Similarly, the logs in the state change log table, Table 5, are logs of state change events. And, logs in the object value change table, Table 6, are logs of object value change events.

TABLE 4

| Common Information Model - CIM Simulcrypt Logs Module - LM Logs Group - Alarm Logs Table | Object Justification | Maximum Access Right |
|---|---|---|
| ImAlarmLogName, the unique name of the Log Control Entry, EntryName (SNMP) | provides a unique identification of the alarm log entry; it is identical to the event name | read |
| ImAlarmLogTime, the time at which the alarm has been logged, TimeTicks (SNMP) | provides a unique identification of Log Tables | read |
| ImAlarmLogText, a textual description of the event being logged, ASCII string of maximum 256 characters | records the event description | read |
| ImAlarmLogType, the event type of this log entry, enumerated (ITU-T X.734) | records alarm type | read |
| ImAlarmLogCause, the event cause of this log entry, enumerated (ITU-T X.734) | records event cause | read |
| ImAlarmLogSeverity, the alarm severity of the logged event, enumerated (ITU-T X.734) | records event severity | read |
| ImAlarmLogSpecificProblems, the identifier of the object that caused the logged event, OBJECT IDENTIFIER (SNMP) | records the id of objects causing the event | read |
| ImAlarmLogTrendIndication, the trend of the event that has been logged, enumerated (ITU-T X.734) | records event trend | read |
| ImAlarmLogChangedObjectId, identifies the object that changed value and caused the logged event, OBJECT IDENTIFIER (SNMP) | records the id of the object causing the event | read |

TABLE 5

| Common Information Model CIM Simulcrypt Logs Module - LM Logs Group - State Change Log Table | Object Justification | Maximum Access Right |
|---|---|---|
| ImStateChangeLogName, the unique name of the Log Control Entry, EntryName (SNMP) | provides a unique identification of the log entry; it is identical to the event name | read |
| ImStateChangeLogTime, the time at which the alarm has been logged, TimeTicks (SNMP) | provides a unique identification of Log Tables | read |
| ImStateChangeLogTime, a textual description of the event being logged, ASCII string of maximum 256 characters | records the event description | read |
| ImStateChangeLogToState, the to state change of the event being logged, enumerated (ITU-T X.734) | records event to state change | read |
| ImStateChangeLogChangedObjectId, identifies the object that changed value and caused the logged event, OBJECT IDENTIFIER (SNMP) | records the id of the object causing the event | read |

TABLE 6

| Common Information Model - CIM Simulcrypt Logs Module - LM Logs Group - Value Change Logs Table | Object Justification | Maximum Access Right |
|---|---|---|
| ImValueChangeLogName, the unique name of the Log Control Entry, EntryName (SNMP) | provides a unique identification of the log entry; it is identical to the event name | read |
| ImValueChangeLogTime, the time at which the alarm has been logged, TimeTicks (SNMP) | provides a unique identification of Log Tables | read |
| ImValueChangeLogText, a textual description of the event being logged, ASCII string of maximum 256 characters | records the event description | read |
| ImValueChangeLogChangedObjectId, identifies the object that changed value and caused the logged event, OBJECT IDENTIFIER (SNMP) | records the id of the object causing the event | read |

(P)SI Information Advertisement (P)SI information is advertised in SNMPv2 SMI tables. Each table maintains the row status through an EntryStatus type object and the administrative state in the same manner as the tables in the previous sections. All MPEG/DVB data types are mapped to SNMPv2 SMI types. Each MPEG/DVB section is represented by SNMPv2 SMI tables as follows:

1. MPEG program_association_section in PAT;
2. MPEG CA_section in CAT;
3. MPEG TS_program_map_section in PMT;
4. DVB network_information_section in NIT-O and NIT-A;
5. DVB service_description_section in SDT in SDT-O and SDT-A;
6. DVB event_information_section in EIT-A-PF, EIT-O-PF, EIT-A-ES, and EIT-O-ES;
7. DVB bouquet_association_section in BAT;
8. DVB time_date_section in TDT;
9. DVB running_status_section in RST; and
10. DVB stuffing_section in ST.

Operations Reference Points (ORPs)

Information exchange and synchronization between C(P)SI and (P)SI generators is accomplished as follows using ORPs:

The (P)SI generator (PSIG) implements three SNMPv2 SMI modules, namely (1) events module as specified in the section entitled "Event Mechanism", (2) logs module as specified in the section entitled "Logging Mechanism", and (3) (P)SI information as specified in the section entitled "(P)SI Information Advertisement".

The manager maintaining the C(P)SI-CPSIM-reads the (P)SI tables by using SNMPv2 get, getNext, or getBulk commands.

CPSIM configures an event in PSIGs events module that will generate an event whenever an object or a group of objects in the EIT changes value. The EIT may include additional event scheduling status information with each one of the objects. The value change in that status may be configured as the event trigger by the CPSIM.

CPSIM configures the EFD in PSIG and, through the EFD, schedules what objects are to be forwarded to what destinations.

PSIG generates the event and consults the EFD table. If scheduled, event notifications are generated and sent to the CPSIM and possibly other destinations.

The PSIG continues generating and forwarding events until reconfigured by the CPSIM. This ensures that the event is received by the intended recipient.

If necessary, the CPSIM updates (P)SI tables in the PSIG such as the CAT.

To save networking bandwidth, it is possible to only transmit basic event information using event notifications. Additional information can be logged through the logging mechanism described in the section entitled "Logging Mechanisms". In this event, the log control table in the PSIG is configured by the CPSIM to define exactly which events and which associated objects are logged.

Figure 2:
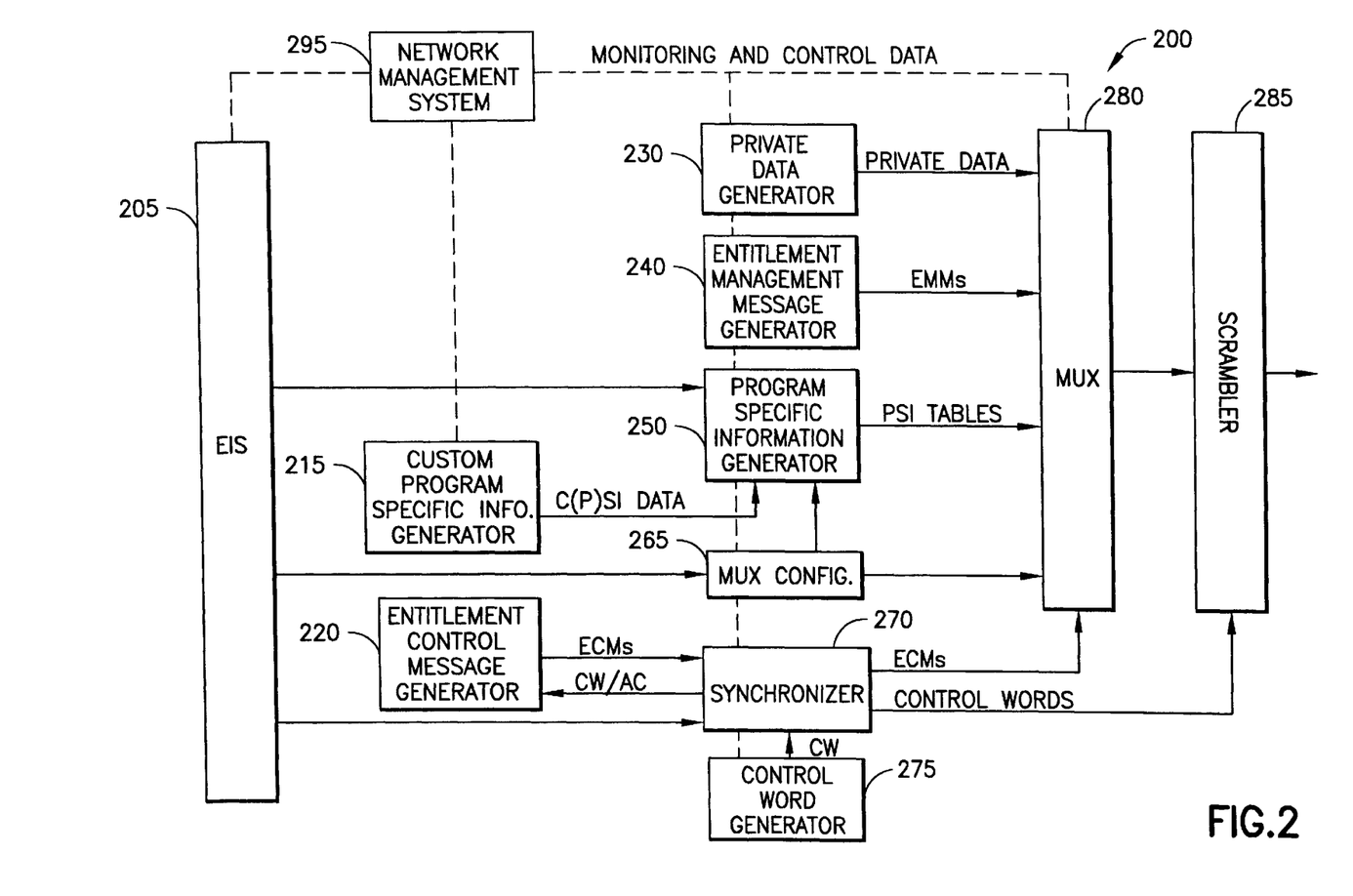
FIG. 2 illustrates a broadcast headend with conditional access components as agents, and a network management system as a management entity component, in accordance with the present invention.

FIG. 2 illustrates a broadcast headend with conditional access components as agents, and a network management system as a manager, in accordance with the present invention. A headend, shown generally at 200, includes an Event Information Scheduler (EIS) 205 which provides event scheduling information to a Program Specific Information (PSI) generator 250, a mux configuration component 265, and a sychronizer 270. The EIS 205 is an agent that receives data from a management entity component regarding the scheduling of events. For example, the events may be television programs which are scheduled by channel, programming source, e.g., CNN and HBO, and time.

The PSI generator 250 also receives custom and/or program specific information, i.e., C(P)SI, from a C(P)SI generator component 215, and provides corresponding PSI tables to the mux 280. PSI is defined in the MPEG standard.

An Entitlement Control Message Generator (ECMG) 220 provides entitlement control messages (ECMs) to the synchronizer 270, which provides the ECMs at the proper time to the mux 280. The synchronizer also provides control words (CW) and access criteria (AC) data to the ECMG 220.

An Entitlement Management Message (EMM) generator 240 provides EMMs to the mux 280, while a private data generator 230 provides private data to the mux 280. An EMM may include cryptographic keys such as group keys which are used by a decoder to decoder an encrypted television signal, for example. The EMMs are appended to the various programming services to authorize the decoders to receive particular programming services, for example, according to a tiered marketing scheme. Possession of the group key or keys along with the appropriate entitlement control data allows the decoders to recover program keys from the program data sent by the service provider in the ECMs. ECMs and EMMs are well-known in the art, for example, as discussed in commonly-assigned U.S. Pat. No. 5,627,892 to Kauffman.

Under the control of the synchronizer 270, the mux multiplexes the input data and provides it to a scrambler 285 for scrambling (e.g., encryption), also under the control of the synchronizer. The output of the mux 280 may be an MPEG transport stream which includes various other types of data, including audio and video, not shown. The output of the scrambler 285 comprises CA data that is subsequently transmitted to an end user, e.g., via CATV network or digital satellite broadcast network. The synchronizer 270 times the multiplexing of the private data from component 230, EMMs from component 240, ECMs from component 220, and control words from component 275.

Note that components 215, 220, 230, 240 are used for providing conditional access, while components 205, 250, 265, 270, 275 and 285, are host headend components.

The CA components of the headend 200 act as agents which communicate with a management entity component such as the network management system 295. The network management system 295 may be local to the headend 200, or at a remote location. The network management system 295 may use a communication path such as a telephone line, LAN, ATM network, or other computer network link, for example, to provide monitoring and control data to the agent components, and to receive the asynchronous notifications from the agent components.

In FIG. 2, one or more different types of private data, EMMs, PSI tables and ECMs may be provided according to the specific format of the television or other signal in which the CA data will be used. Furthermore, while the components are logically separate, they may reside within the same physical component, in which case there is only one agent for the merged components.

The different components in FIG. 2 are synchronized with one another through the use of ORPs, i.e., message exchanges using the transaction mechanism as defined by the procedure and information to be exchanged.

Figure 3:
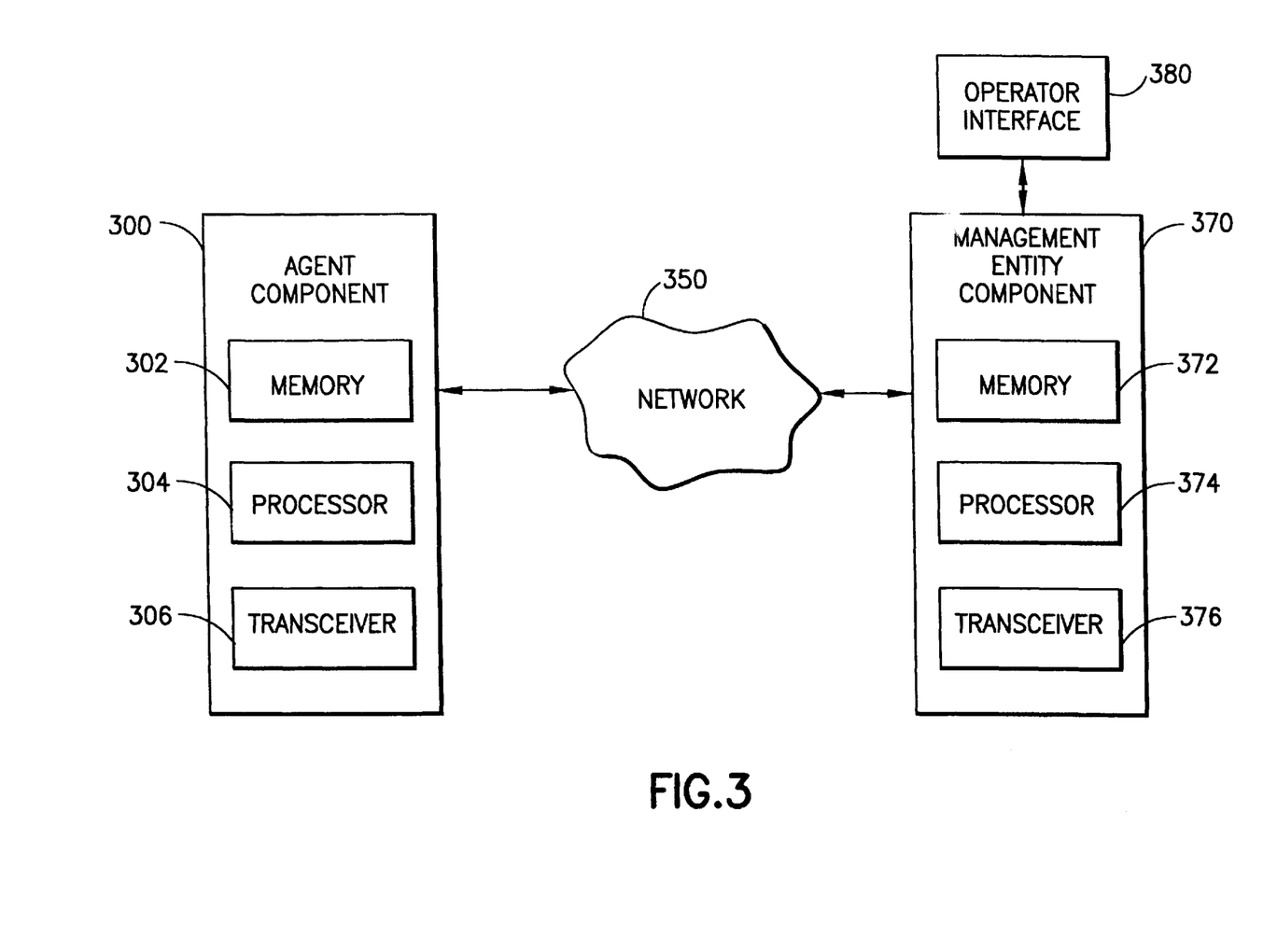
FIG. 3 illustrates an agent component and a management entity component in accordance with the present invention.

FIG. 3 illustrates an agent component and a management entity component in accordance with the present invention. The agent component (e.g., agent) 300 communicates with a management entity component (e.g., manager) 370 via a network 350, such as a LAN, computer network, Internet, or telephone network. The agent component 300 includes a memory 302, processor 304, and transceiver 306, while the management entity component similarly includes a memory 372, processor 374, and transceiver 376. Typically, several agent components, and one or more management entity components are provided, but only one of each is shown here for simplicity.

Moreover, one or more agents may share a memory, processor, and/or transceiver, or each agent may have its own separate hardware. Generally, the manager has its own hardware but can possibly also share hardware with the agents.

The manager 370 may communicate with an operator interface 380, such as a keyboard, to receive information such as the administrative and operational states of the agent components. The manager 380 may be implemented as a workstation, personal computer or other type of computer, or as a computer board or as a computer chip set. The memory 372 may comprise RAM, for example, and the processor 374 may be a microprocessor. The transceiver 376; or transmitter/receiver is a conventional circuit such as a modem used for transmitting and receiving data.

A computer code to be used by the manager 370 may be stored in the memory 372 and operated on by the processor 374. Information received from the operator interface 380 may also be stored in the memory 372. Additionally, the MIB of the manager 370 may be provided as part of the general purpose memory 372.

The processor 374 may be used to execute the computer code to communicate information to specific agents, and to process information received from the agents.

As will be appreciated by those skilled in the art, the processors 304, 374 may read and write data from the associated memories 302, 372, and send data to, and receive data from the respective transceivers 306, 376. In this manner, the management component 370 and agent component 300 may communicate data, control signals, polling signals, and other information between themselves. Moreover, the respective processors 304, 374 may include timing circuits that indicate particular times for a specific data transmission to occur.

In particular, the processor 304 may be responsive to the transceiver 306 for updating the MIB (in memory 306) with information of the communication network that is received by the transceiver. The transceiver 376 may be responsive to the processor 374 for periodically (e.g., intermittently) transmitting control signals to the processor 304, e.g., via the transceiver 306. The transceiver 306 is responsive to the processor 304 and the control signals from the manager for transmitting the updated information from the MIB to the manager's transceiver 376 for storage at the manager's MIB in memory 372.

The manager's transceiver 376 is responsive to its processor 374 for periodically transmitting information to the agent's processor 304 for storage at the agent's MIB to synchronize insertion of data into the digital broadcast data stream by one or more agent components.

The agent 300 may represent one or more resources or other agents, e.g., sub-agents. The MIB of the agent 300 may be provided as part of the general purpose memory 302.

Information, such as administrative state information and event information may be communicated from the manager 370 to the agent 300 and stored in the memory 302. Event table data, EFD table data, and log control table data may also be stored in the memory 302 for use by the agent component 300. Alarm, state change, and value change log data may also be stored in the memory 302.

The processor 304 may be used to communicate information to, and receive information from, the manager 370 and any other resource or sub-agent.

The manager 370 may be a standalone device (e.g., computer), or may be a capability implemented on a shared system. The manager 370 serves as an interface for a human operator/manager into the management system and includes:

Management applications for data analysis, fault recovery, etc.;

A monitoring/control interface of the network for the manager;

The capability to translate a network manager's commands into actual monitoring and control of remote elements; and A database of information extracted from the MIBs of all the managed entities in the network.

The agent components respond to requests for actions from the manager 370. The manager 370 may also provide the agent 300 with important unsolicited information. Each agent supports access to a collection of managed resources, which are represented by managed objects referred to as the MIB. Managed objects are standardized across systems of a particular class; for example, all EMM generators support a standard set of objects, in addition to some objects that are specific to a particular manufacturer's EMM generator model.

The manager performs a monitoring function by retrieving the value of MIB objects from the agents. A manager can cause an action to take place at an agent, or change the configuration settings of an agent by modifying the value of specific variables. For example, a manager can request an MPEG table insertion into an MPEG transport stream by making a table entry into the corresponding table in a MIB.

As can be seen, the present invention provides a method and apparatus for providing synchronization and information exchange in a network. The method allows a management entity component, such as a computer workstation operated at a control center, to coordinate the actions of different agent components, such as hardware used at the headend or uplink site of a television network. In particular, the agent components may provide conditional access data for a television signal.

Although the invention has been described in connection with various specific embodiments, those skilled in the art will appreciate that numerous adaptations and modifications may be made thereto without departing from the spirit and scope of the invention as set forth in the claims.

What is claimed is:

1. A method for providing communication between first and second headend, uplink and/or conditional access agent components and a management component thereof in a communication network, comprising the steps of:

providing respective management information bases (MIBs) for said first and second agent components and said management component;

said first and second agent components updating their respective MIBs with information of said communication network;

said management component periodically reading said MIBs of said first and second agent components to obtain the updated information therefrom, and storing the updated information in its respective MIB;

wherein said management component provides information to said MIBs of said first and second agent components to synchronize an insertion of data into a digital broadcast data stream by said first and second agent components.

2. The method of claim 1, wherein:

said first agent component advertises event schedule information of said communication network by making said event schedule information available to said management component and said second agent component via said first agent component's respective MIB.

3. The method of claim 1, comprising the further step of:

transmitting event reporting information from said management component to at least said first agent component to allow said first agent component to implement an event reporting procedure;

said event reporting information defining pre-conditions for said first agent component to declare an event;

said first agent component asynchronously notifying said management component of an event when said pre-conditions have been met.

4. The method of claim 3, wherein a plurality of management components are provided in said communication network, comprising the further step of:

transmitting information from at least a particular one of said management components to said first and second agent components to register said particular management component as a recipient of the asynchronous event notifications thereof.

5. The method of claim 3, comprising the further step of:

transmitting event logging information from said management component to at least said first agent component to allow said first agent component to implement an event logging procedure according to said event reporting procedure;

said event logging information defining pre-conditions for said first agent component to log an event.

6. The method of claim 3, comprising the further step of:

transmitting event forwarding discriminator information from said management component to at least said first agent component to allow said first agent component to implement an event forwarding discriminator procedure according to said event reporting procedure;

said event forwarding discriminator information defining pre-conditions for said first agent component to forward an event to said management component.

7. The method of claim 1, wherein:

at least one of said first and second agent components is a conditional access agent component for inserting conditional access data into said digital broadcast data stream.

8. The method of claim 7, wherein:

said management component provides conditional access information to said MIB of said conditional access agent component.

9. The method of claim 1, wherein:

said management component and said first and second agent components are synchronized with one another.

10. An apparatus for providing communication between first and second headend, uplink and/or conditional access agent components and a management component thereof in a communication network, comprising:

respective management information bases (MIBs) for said first and second agent components and said management component;

means associated with said first and second agent components for updating their respective MIBs with information of said communication network;

means associated with said management component for periodically reading said MIBs of said first and second agent components to obtain the updated information therefrom;

means for storing the updated information in said MIB of said management component; and means associated with said management component for providing information to said MIBs of said first and second agent components to synchronize an insertion of data into a digital broadcast data stream by said first and second agent components.

11. The apparatus of claim 10, further comprising:

means associated with said first agent component for advertising event schedule information of said communication network by making said event schedule information available to said management component and said second agent component via said first agent component's respective MIB.

12. The apparatus of claim 10, further comprising:

means for transmitting event reporting information from said management component to at least said first agent component to allow said first agent component to implement an event reporting procedure;

said event reporting information defining pre-conditions for said first agent component to declare an event; and means associated with said first agent component for asynchronously notifying said management component of an event when said pre-conditions have been met.

13. The apparatus of claim 12, wherein a plurality of management components are provided in said communication network, further comprising:

means for transmitting information from at least a particular one of said management components to said first and second agent components to register said particular management component as a recipient of the asynchronous event notifications thereof.

14. The apparatus of claim 12, further comprising:

means for transmitting event logging information from said management component to at least said first agent component to allow said first agent component to implement an event logging procedure according to said event reporting procedure;

said event logging information defining pre-conditions for said first agent component to log an event.

15. The apparatus of claim 12, further comprising:

means for transmitting event forwarding discriminator information from said management component to at least said first agent component to allow said first agent component to implement an event forwarding discriminator procedure according to said event reporting procedure;

said event forwarding discriminator information defining pre-conditions for said first agent component to forward an event to said management component.

16. The apparatus of claim 10, wherein at least one of said first and second agent components is a conditional access agent component, further comprising:

means associated with said conditional access agent component for inserting conditional access data into said digital broadcast data stream.

17. The apparatus of claim 16, further comprising:

means associated with said management component for providing conditional access information to said MIB of said conditional access agent component.

18. The apparatus of claim 10, wherein:

said management component and said first and second agent components are synchronized with one another.

19. The apparatus of claim 10, wherein:

said communication network comprises a broadband network for providing said digital broadcast data stream to a decoder population.

20. An apparatus for providing communication between first and second headend, uplink and/or conditional access agent components and a management component thereof in a communication network, comprising:

at least one memory associated with said first and second agent components providing respective management information bases (MIBs) thereof;

a memory associated with said management component providing a MIB thereof;

at least one transceiver associated with said first and second agent components;

a transceiver associated with said management component;

at least one processor associated with said first and second agent components;

a processor associated with said management component;

said at least one processor responsive to said at least one transceiver for updating said MIBs of said first and second agent components with information of said communication network;

said transceiver of said management component responsive to said processor thereof for periodically transmitting control signals to said at least one processor;

said at least one transceiver responsive to said at least one processor and said control signals for transmitting the updated information from said MIBs of said first and second agent components to said transceiver of said management component for storage at the MIB thereof;

said transceiver of said management component responsive to said processor thereof for periodically transmitting information to said at least one processor for storage at the MIBs of said first and second agent components to synchronize an insertion of data into a digital broadcast data stream by said first and second agent components.

* * * * *